United States Patent
Lovett et al.

(10) Patent No.: US 8,534,071 B1
(45) Date of Patent: Sep. 17, 2013

(54) ENGINE HOT SECTION VANE WITH TAPERED FLAME HOLDER SURFACE

(75) Inventors: Jeffrey A. Lovett, Tolland, CT (US); Donald J. Hautman, Marlborough, CT (US); Torence P. Brogan, Manchester, CT (US); Christopher A. Eckett, New Britain, CT (US); Meredith B. Colket, III, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/441,031

(22) Filed: Apr. 6, 2012

(51) Int. Cl.
*F02K 3/10* (2006.01)

(52) U.S. Cl.
USPC .......................................................... 60/765

(58) Field of Classification Search
USPC .................................................. 60/761–766
See application file for complete search history.

(56) References Cited

U.S. PATENT DOCUMENTS

| | | | |
|---|---|---|---|
| 3,330,117 A * | 7/1967 | Coplin et al. | 60/762 |
| 3,465,525 A * | 9/1969 | Cowley et al. | 60/762 |
| 3,595,024 A * | 7/1971 | Kohler et al. | 60/251 |
| 3,800,530 A * | 4/1974 | Nash | 60/761 |
| 4,686,826 A * | 8/1987 | Koshoffer et al. | 60/762 |
| 4,798,048 A * | 1/1989 | Clements | 60/764 |
| 4,899,539 A | 2/1990 | Gastebois et al. | |
| 5,001,898 A | 3/1991 | Holladay | |
| 5,230,214 A | 7/1993 | Pechette | |
| 5,385,015 A | 1/1995 | Clements et al. | |
| 5,396,761 A * | 3/1995 | Woltmann et al. | 60/39.827 |
| 5,396,763 A * | 3/1995 | Mayer et al. | 60/765 |
| 5,400,589 A * | 3/1995 | Mahias et al. | 60/762 |
| 5,685,140 A * | 11/1997 | Clements et al. | 60/204 |
| 7,093,442 B2 | 8/2006 | Lovett | |
| 7,168,236 B2 | 1/2007 | Schmotolocha et al. | |
| 7,578,131 B2 | 8/2009 | Muldoon et al. | |
| 7,647,775 B2 | 1/2010 | Muldoon et al. | |
| 7,712,315 B2 | 5/2010 | Hautman et al. | |
| 2010/0126177 A1 | 5/2010 | Hautman et al. | |

* cited by examiner

*Primary Examiner* — Phutthiwat Wongwian
(74) *Attorney, Agent, or Firm* — O'Shea Getz P.C.

(57) ABSTRACT

A gas turbine or rocket engine hot section includes a first duct case, a second duct case, a plurality of vanes arranged about an axial centerline, and an igniter located with a first of the plurality of vanes. The first of the plurality of vanes extends axially between a leading edge and a flame holder surface at a trailing edge. The flame holder surface extends radially between a first vane end connected to the first duct case and a second vane end connected to the second duct case. The flame holder surface includes a first section that tapers towards the first vane end, and a second section that tapers away from the first section and towards the second vane end.

23 Claims, 4 Drawing Sheets

ENGINE HOT SECTION VANE WITH TAPERED FLAME HOLDER SURFACE

This invention was made with government support under Contract No. N00019-02-C-3003 awarded by the United States Navy. The government may have certain rights in the invention.

BACKGROUND OF THE INVENTION

1. Technical Field

The present invention relates generally to gas turbine and rocket engines and, in particular, to a hot section that includes a vane with a flame holder surface.

2. Background Information

Gas turbine and/or rocket engines may include one or more engine hot sections such as, for example, a combustor section and an augmentor (afterburner) section. Such hot sections are typically configured to (i) inject fuel into a core gas flowing through the section and (ii) ignite the injected fuel with a flame to generate thrust.

One type of gas turbine engine hot section includes a plurality of bluff body flame holders. Each flame holder may include a flame holder vane. The flame holder extends radially between an inner duct case and an outer duct case, and extends axially from a leading edge to a flame holder surface at a trailing edge. The flame holder surface is typically configured with a constant circumferential surface width. The surface width may be sized to maintain a flame that extends radially between the inner duct case and the outer duct case adjacent to the flame holder surface. Typically, the surface width is oversized in order to increase flame stability. Over sizing the surface width, however, may also increase the surface area of the flame holder surface and thereby the weight of the flame holder vane. There is a need in the art, therefore, for a hot section vane configuration that may increase flame stability while also decreasing vane surface width and vane weight.

SUMMARY OF THE DISCLOSURE

According to a first aspect of the invention, an engine hot section includes a first duct case, a second duct case, a plurality of vanes arranged about an axial centerline, and an igniter located with a first of the plurality of vanes. The first of the plurality of vanes extends axially between a leading edge and a flame holder surface at a trailing edge. The flame holder surface extends radially between a first vane end connected to the first duct case and a second vane end connected to the second duct case. The flame holder surface includes a first section that tapers towards the first vane end, and a second section that tapers away from the first section and towards the second vane end.

In an embodiment, the first section includes a first length that radially extends between a first section inner end and a first section outer end. The second section includes a second length that radially extends between a second section inner end and a second section outer end. In an embodiment, the first length is substantially equal to the second length. In another embodiment, the first length is greater than the second length. In still another embodiment, the first length is less than the second length.

In an embodiment, the flame holder surface also includes a third section with a substantially uniform circumferential width. The third section extends radially between the first section and the second section and circumferentially between a first vane side and a second vane side.

In an embodiment, the first of the vanes extends circumferentially between a first vane side and a second vane side. The first vane side and the second vane side each taper from the second vane end to the first vane end.

In an embodiment, the first duct case includes a radial inner duct case, and the second duct case includes a radial outer duct case. In another embodiment, the first duct case includes a radial outer duct case, and the second duct case includes a radial inner duct case.

In an embodiment, the igniter includes a pilot flame tube located at the first vane end. In an embodiment, the pilot flame tube is connected to the first duct case.

According to a second aspect of the invention, a gas turbine engine includes a compressor section, a turbine section and an engine hot section that includes a first duct case, a second duct case and an igniter located with a vane. The vane extends axially between a leading edge and a flame holder surface at a trailing edge. The flame holder surface extends radially between a first vane end connected to the first duct case and a second vane end connected to the second duct case. The flame holder surface includes a first section that tapers towards the first vane end, and a second section that tapers away from the first section and towards the second vane end.

In an embodiment, the gas turbine engine also includes a combustor section, and the engine hot section includes an augmentor section. The compressor section, the combustor section, the turbine section and the augmentor section are arranged sequentially along an axial centerline.

The foregoing features and the operation of the invention will become more apparent in light of the following description and the accompanying drawings.

DETAILED DESCRIPTION OF THE INVENTION

Figure 1:
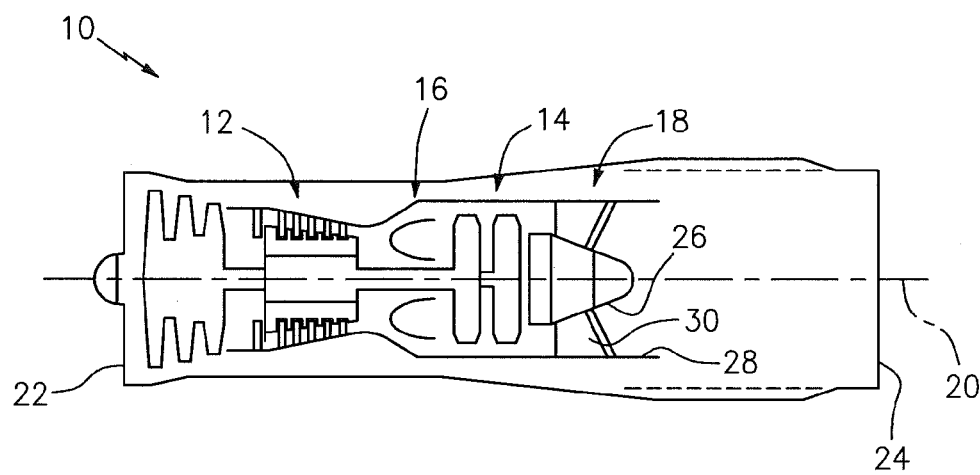
FIG. 1 is a side-sectional illustration of a gas turbine engine.

FIG. 1 is a side-sectional illustration of a gas turbine engine 10. The engine 10 includes a compressor section 12, a turbine section 14 and one or more engine hot sections. The engine hot sections may include, for example, a first engine hot section 16 configured as a combustor section and a second engine hot section 18 configured as an augmentor section. The compressor section 12, the first engine hot section 16, the turbine section 14 and the second engine hot section 18 may be sequentially aligned along an axial centerline 20 between a forward engine airflow inlet 22 and an aft engine airflow exhaust 24.

Figure 2:
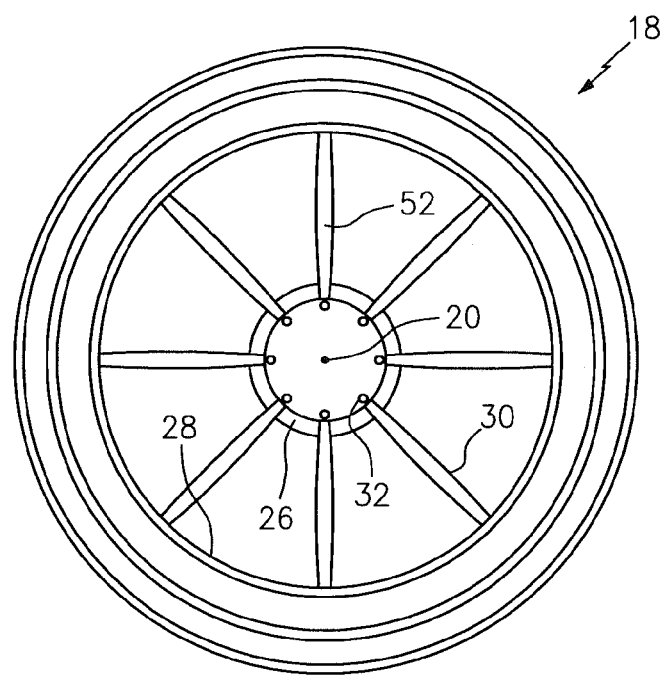
FIG. 2 is a cross-sectional illustration of a gas turbine engine hot section.

Referring to FIG. 2, the second engine hot section 18 includes a first (e.g., annular, radial inner) duct case 26, a second (e.g., annular, radial outer) duct case 28, one or more hot section vanes 30, and one or more igniters 32 (e.g., pilot flame tubes and/or spark plugs). The second engine hot section 18 may also include an augmentor fuel delivery system with one or more augmentor spray bars, which is not shown in order to simplify the drawings. Examples of such an augmentor fuel delivery system, however, are disclosed in U.S. Pat. Nos. 7,578,131, 7,647,775 and 7,712,315, which are hereby incorporated by reference in their entirety, and which are assigned to the assignee of the present invention.

Figure 3:
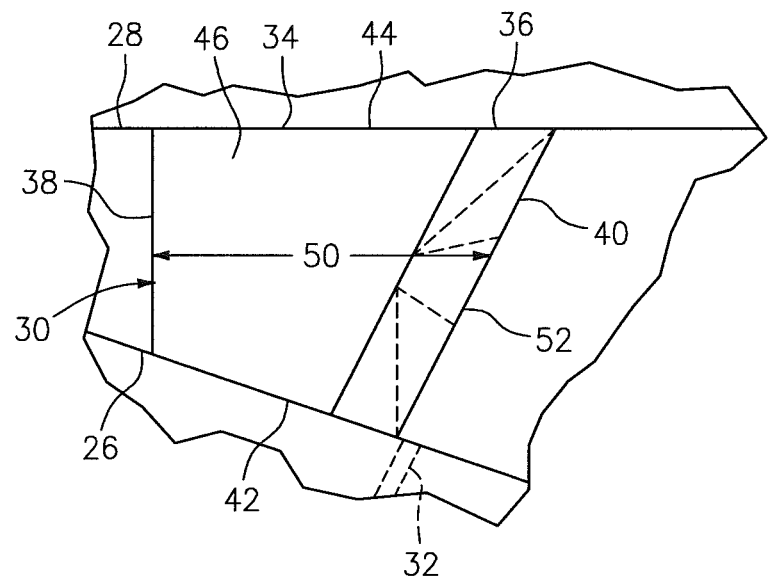
FIG. 3 is a side view illustration of a hot section vane.
Figure 4:
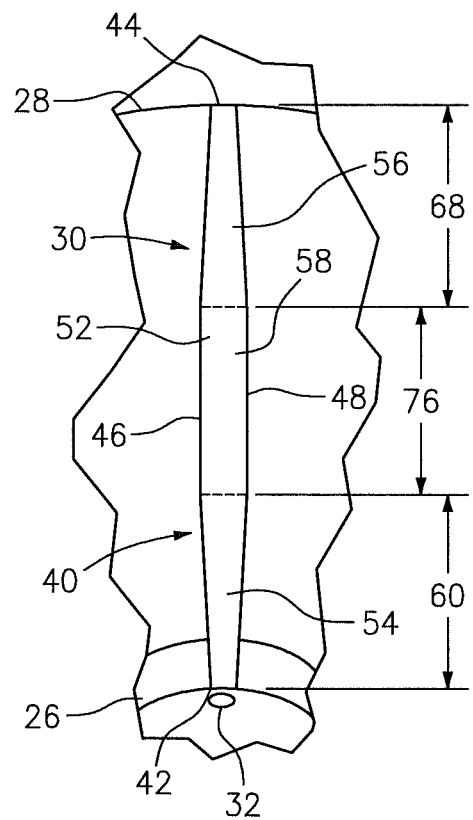
FIG. 4 is an end view illustration of the hot section vane illustrated in FIG. 3.

Referring to FIG. 3, each of the vanes 30 may include a vane airfoil 34 and a trailing edge box 36, which may be configured to house a respective one of the augmentor spray bars. Each of the vanes 30 extends axially between a vane leading edge 38 and a vane trailing edge 40. Each of the vanes 30 extends radially between a first (e.g., radial inner) vane end 42 and a second (e.g., radial outer) vane end 44. Referring to FIG. 4, each of the vanes 30 also extends circumferentially between a first vane (e.g., pressure) side 46 and a second vane (e.g., suction) side 48. Referring again to FIG. 3, the first vane side 46 and the second vane side 48 may each have an axial width 50 that decreases as the respective vane side extends radially from the second vane end 44 to the first vane end 42; e.g., the first and second vane sides 46 and 48 taper from the second vane end 44 to the first vane end 42.

One or more of the vanes 30 also includes a (e.g., planar) flame holder surface 52 located at a respective vane trailing edge 40. Referring to FIG. 4, the flame holder surface 52 may extend radially from the first vane end 42 to the second vane end 44. The flame holder surface 52 may also extend circumferentially between the first vane side 46 and the second vane side 48.

Figure 6:
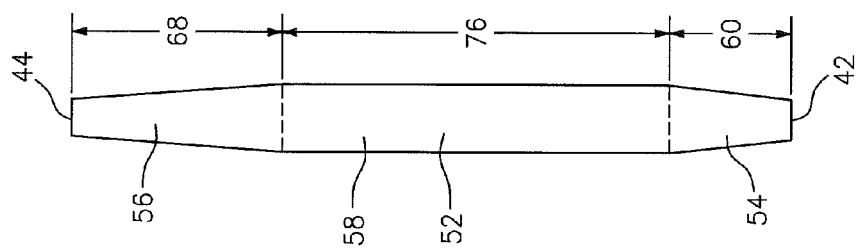
FIG. 6 is an end view illustration of another alternate hot section vane.
Figure 5:
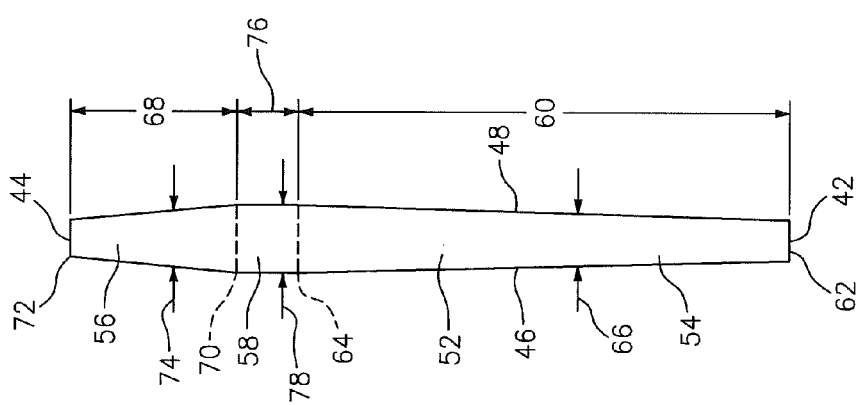
FIG. 5 is an end view illustration of an alternate hot section vane.

Referring to FIGS. 4-7, the flame holder surface 52 may have a plurality of (e.g., planar) flame holder surface sections including, for example, a tapered first (e.g., radial inner) section 54 and a tapered second (e.g., radial outer) section 56. The first section 54 may circumferentially taper as the section extends radially towards the first vane end 42. The second section 56 may circumferentially taper as the section extends radially away from the first section 54, and towards the second vane end 44. Referring to FIGS. 4-6, the flame holder surface 52 may also include a (e.g., non-tapered) third section 58 that, for example, extends radially between the first section 54 and the second section 56.

Referring to the flame holder surface 52 illustrated in FIG. 5, the first section 54 has a first length 60 that extends radially between a first section inner end 62 and a first section outer end 64. The first section 54 also has a first width 66 that extends circumferentially between the first vane side 46 and the second vane side 48. The first width 66 increases as the first section 54 extends radially from the first section inner end 62 to the first section outer end 64. The second section 56 has a second length 68 that extends radially between a second section inner end 70 and a second section outer end 72. The second section 56 also has a second width 74 that extends circumferentially between the first vane side 46 and the second vane side 48. The second width 74 decreases as the second section 56 extends radially from the second section inner end 70 to the second section outer end 72. The third section 58 has a third length 76 that extends radially between the first section outer end 64 and the second section inner end 70. The third section 58 also has a (e.g., substantially uniform) third width 78 that extends between the first vane side 46 and the second vane side 48.

The aforesaid lengths and/or widths of the flame holder surface sections (e.g., 54, 56 and/or 58) may be sized to reduce weight and radar signature of the vanes 30. The first width 66, the second width 74 and/or the third length 76, for example, may be sized such that the flame holder surface 52 has a relatively small surface area, which may reduce vane 30 weight and radar signature. The lengths and/or widths of the flame holder surface sections (e.g., 54, 56 and/or 58) may also be sized to increase flame stability in the second engine hot section 18, which is described below in further detail.

Referring to FIG. 2, the vanes 30 and the igniters 32 are respectively arranged circumferentially around the axial centerline 20. Referring to FIGS. 3 and 4, each first vane end 42 is connected to the first duct case 26, and each second vane end 44 is connected to the second duct case 28. Each of the igniters 32 may be respectively located at the first vane end 42 and connected to the first duct case 26.

Figure 8:
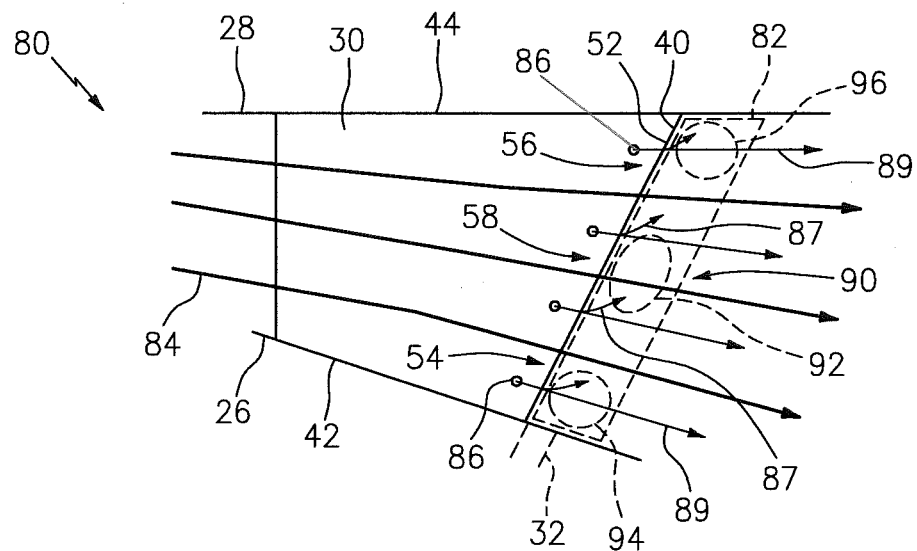
FIG. 8 is a side view illustration of still yet another hot section vane.
Figure 9:
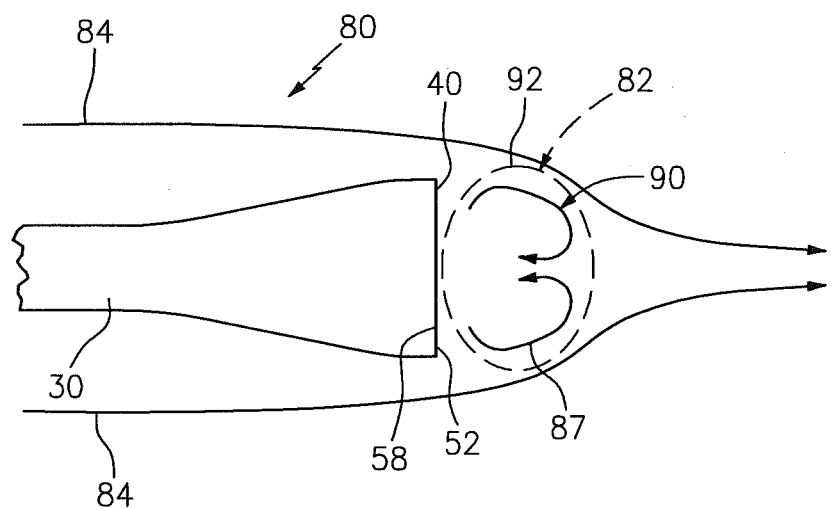
FIG. 9 is an enlarged cross-sectional illustration of a trailing edge portion of the hot section vane illustrated in FIG. 8.

During operation of the engine hot section 80 illustrated in FIGS. 8 and 9, a radially elongated low pressure and velocity region 82 may be formed adjacent to the flame holder surface 52 between the first duct case 26 and the second duct case 28 as a core gas 84 is directed around each respective vane 30. Fuel may be injected into the core gas 84 by one or more augmentor spray bar fuel injectors 86 arranged with the respective vane 30. A first portion of the fuel 87 may enter the low pressure region 82 adjacent the flame holder surface 52, and may be ignited by a pilot flame or a spark provided by the respective igniter 32. At least a portion of the ignited fuel 87 may re-circulate within the low pressure region 82 along the flame holder surface 52 between the first vane end 42 and the second vane end 44. The re-circulating ignited fuel 87 within the low pressure region 82 may form a substantially stable flame 90 adjacent to the vane trailing edge 40. The flame 90 may be utilized for igniting, for example, a second (e.g., larger) portion of the fuel 89 injected into the core gas 84 by the fuel injectors 86.

The low pressure region 82 may have a radial pressure gradient that changes radially along the flame holder surface 52 and therefore may affect the stability of the flame 90. The pressure gradient may be created by, for example, the angling the flame holder surface 50 in the radial plane and/or the aerodynamics of the flow passage. The pressure gradient may include, for example, a low pressure zone 92 that is located radially between a plurality of high pressure zones 94 and 96. The low pressure zone 92 is formed by the core gas 84 passing the relatively wide third section 58, and the high pressure zones 94 and 96 are respectively formed by the core gas 84 passing the tapered first section 54 and the tapered second section 56.

The radial location of the low pressure zone 92 along the flame holder surface 52 is defined by the radial location of the third section 58. The magnitude of the pressure differential between the low pressure zone 92 and the high pressure zones 94 and 96 is defined by the size differential between the third width 78 and the tapering first and second widths 66 and 74 (see FIG. 5). The lengths and/or widths of the flame holder surface sections (e.g., 54, 56 and/or 58) therefore may be sized to tailor the pressure gradient and thus flow dynamics of the flame 90. The length and/or width of the third section may be increased, for example, to decrease pressure in the low pressure zone 92 and thereby increase the flame 90 stability within the second engine hot section 18.

Figure 7:
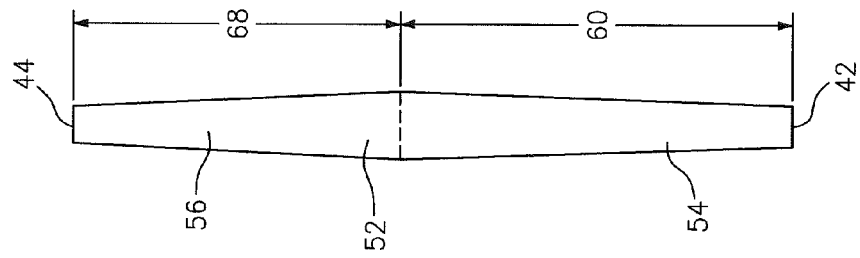
FIG. 7 is an end view illustration of yet another alternate hot section vane.

In the some embodiments, for example as illustrated in FIGS. 5 and 7, the second length 68 may be sized less than the first length 60. In other embodiments, for example as illustrated in FIG. 6, the second length 68 may be sized greater than the first length 60. In still other embodiments, for example as illustrated in FIG. 4, the second length 68 may be sized substantially equal to the first length 60.

In some embodiments, for example as illustrated in FIG. 5, the third length 76 may be sized less than the first length 60 and/or the second length 68. In other embodiments, for example as illustrated in FIG. 6, the third length 76 may be sized greater than the first length 60 and/or the second length 68. In still other embodiments, for example as illustrated in FIG. 4, the third length 76 may be sized substantially equal to the second length 68 and/or the third length 76.

A person of ordinary skill in the art will recognize that the tapered sections of the flame holder surface 52 may have various alternative geometries to those illustrated in the drawings. In some embodiments, for example, one or more of the tapered sections may include a plurality of tapered subsections that taper according to different slopes. In other embodiments, one or more of the tapered sections may have curved tapered geometries.

In an alternate embodiment, each of the igniters may be respectively located at the second vane end and connected to the second duct case.

The hot section vanes 30 are described above as being included in an augmentor section of a gas turbine engine. A person of ordinary skill in the art, however, will recognize that the disclosed vanes may be included in various other gas turbine engine hot sections and/or various other engine configurations that utilize, for example, bluff body flame holders. In some embodiments, for example, the disclosed vanes may be included in a combustor section of a gas turbine engine. In other embodiments, the disclosed vanes may be included in a combustor section of a rocket engine. In still other embodiments, the flame holders may be oriented circumferentially.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. An engine hot section, comprising:
a plurality of vanes arranged about an axial centerline, a first of the plurality of vanes extends axially between a leading edge and a flame holder surface at a trailing edge, the flame holder surface extends radially between a first vane end connected to a first duct case and a second vane end connected to a second duct case with a first section that tapers towards the first vane end and a second section that tapers away from the first section and towards the second vane end.

2. The engine hot section of claim 1, wherein the first section comprises a first length that radially extends between a first section inner end and a first section outer end, the second section comprises a second length that radially extends between a second section inner end and a second section outer end, and the first length is substantially equal to the second length.

3. The engine hot section of claim 1, wherein the first section comprises a first length that radially extends between a first section inner end and a first section outer end, the second section comprises a second length that radially extends between a second section inner end and a second section outer end, and the first length is greater than the second length.

4. The engine hot section of claim 1, wherein the first section comprises a first length that radially extends between a first section inner end and a first section outer end, the second section comprises a second length that radially extends between a second section inner end and a second section outer end, and the first length is less than the second length.

5. The engine hot section of claim 1, wherein the first duct case comprises a radial inner duct case, and the second duct case comprises a radial outer duct case.

6. The engine hot section of claim 1, wherein the first duct case comprises a radial outer duct case, and the second duct case comprises a radial inner duct case.

7. The engine hot section of claim 1, wherein the igniter comprises a pilot flame tube located at the first vane end.

8. The engine hot section of claim 7, wherein the pilot flame tube is connected to the first duct case.

9. The engine hot section of claim 1, further comprising an igniter located adjacent to the first of the plurality of vanes.

10. An engine hot section, comprising:
a plurality of vanes arranged about an axial centerline, a first of the plurality of vanes extending axially between a leading edge and a flame holder surface at a trailing edge, the flame holder surface that extends radially between a first vane end connected to a first duct case and a second vane end connected to a second duct case with a first section that tapers towards the first vane end and a second section that tapers away from the first section and towards the second vane end, the flame holder surface further includes a third section that extends radially between the first section and the second section and circumferentially between a first vane side and a second vane side, the third section with a substantially uniform circumferential width; and
an igniter located adjacent to the first of the plurality of vanes.

11. An engine hot section, comprising:
a plurality of vanes arranged about an axial centerline, a first of the plurality of vanes that extends axially between a leading edge and a flame holder surface at a trailing edge, the flame holder surface that extends radially between a first vane end connected to a first duct case and a second vane end connected to a second duct case, the flame holder surface includes a first section that tapers towards the first vane end and a second section that tapers away from the first section and towards the second vane end; and
an igniter located adjacent to first of the plurality of vanes, the first of the plurality of vanes extends circumferentially between a first vane side and a second vane side, and the first vane side and the second vane side each taper from the second vane end to the first vane end.

12. A gas turbine engine, comprising:
a compressor section;
a turbine section downstream of the compressor section
an engine hot section downstream of the turbine section, the engine hot section includes
a vane that extends axially between a leading edge and a flame holder surface at a trailing edge, the flame holder surface extends radially between a first vane end connected to a first duct case and a second vane end connected to a second duct case, with a first section that tapers towards the first vane end and a second section that tapers away from the first section and towards the second vane end; and
an igniter located adjacent to the vane.

13. The engine of claim 12, further comprising a combustor section, wherein the engine hot section comprises an augmentor section, and wherein the compressor section, the combustor section, the turbine section and the augmentor section are arranged sequentially along an axial centerline.

14. The engine of claim 12, wherein the first section comprises a first length that radially extends between a first section inner end and a first section outer end, the second section comprises a second length that radially extends between a second section inner end and a second section outer end, and the first length is substantially equal to the second length.

15. The engine of claim 12, wherein the first section comprises a first length that radially extends between a first section inner end and a first section outer end, the second section comprises a second length that radially extends between a second section inner end and a second section outer end, and the first length is greater than the second length.

16. The engine of claim 12, wherein the first section comprises a first length that radially extends between a first section inner end and a first section outer end, the second section comprises a second length that radially extends between a second section inner end and a second section outer end, and the first length is less than the second length.

17. The engine of claim 12, wherein the first duct case comprises a radial inner duct case, and the second duct case comprises a radial outer duct case.

18. The engine of claim 12, wherein the igniter comprises a pilot flame tube located at the first vane end.

19. The engine of claim 18, wherein the pilot flame tube is connected to the first duct case.

20. A gas turbine engine, comprising:
a compressor section;
a turbine section downstream of the compressor section; and
an engine hot section downstream of said turbine section, the engine hot section includes a vane that extends axially between a leading edge and a flame holder surface at a trailing edge, the flame holder surface extends radially between a first vane end connected to a first duct case and a second vane end connected to a second duct case, the flame holder surface further includes a first section that tapers towards the first vane end and a second section that tapers away from the first section and towards the second vane end and a third section extending radially between the first section and the second section and circumferentially between a first vane side and a second vane side, the third section includes a substantially uniform circumferential width; and an igniter located adjacent to the vane.

21. A gas turbine engine, comprising:
a compressor section;
a turbine section downstream of the compressor section; and
an engine hot section downstream of said turbine section, the engine hot section includes a vane that extends axially between a leading edge and a flame holder surface at a trailing edge, the flame holder surface extends radially between a first vane end connected to a first duct case and a second vane end connected to a second duct case, the flame holder surface further includes a first section that tapers towards the first vane end and a second section that tapers away from the first section and towards the second vane end, the vane extends circumferentially between a first vane side and a second vane side, the first vane side and the second vane side each taper from the second vane end to the first vane end; and
an igniter located adjacent to the vane.

22. The engine hot section of claim 1, wherein the first section tapers circumferentially inward between a first vane side and a second vane side towards the first vane end and a second section that tapers circumferentially inward between the first vane side and the second vane side away from the first section and towards the second vane end.

23. The engine of claim 11, wherein the first section tapers circumferentially inward between a first vane side and a second vane side towards the first vane end and a second section that tapers circumferentially inward between the first vane side and the second vane side away from the first section and towards the second vane end.

* * * * *